July 11, 1950  F. C. MILLER ET AL  2,514,892
PHOTOGRAPHIC REPRODUCING DEVICE
Filed Oct. 5, 1946
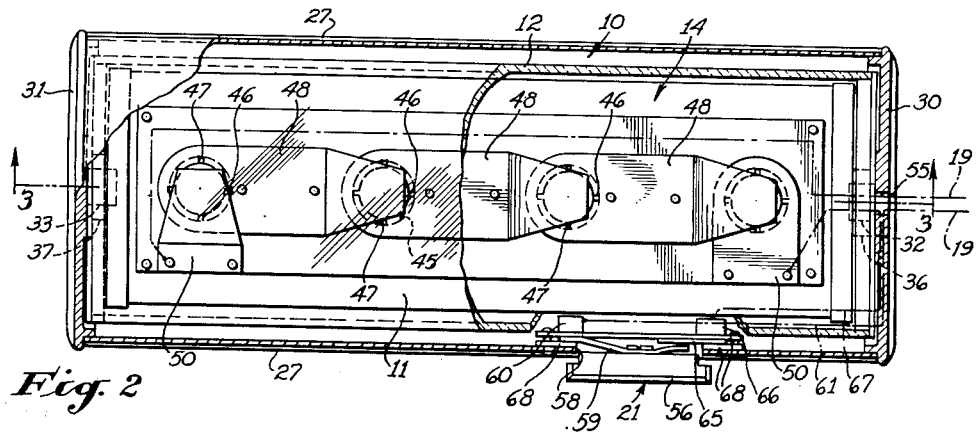
Fig. 2
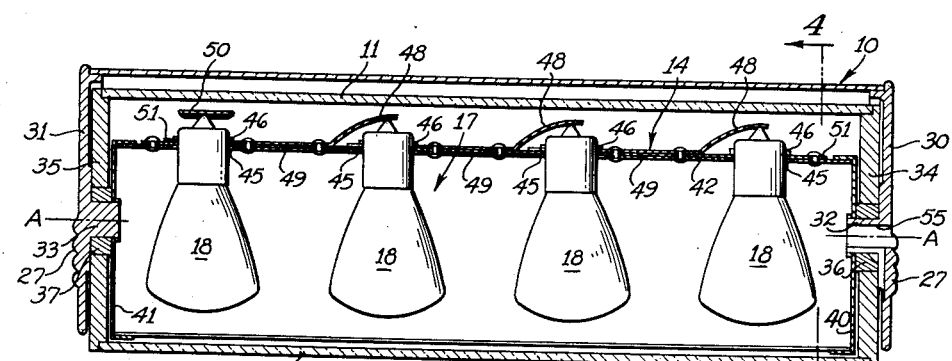
Fig. 3
Fig. 1
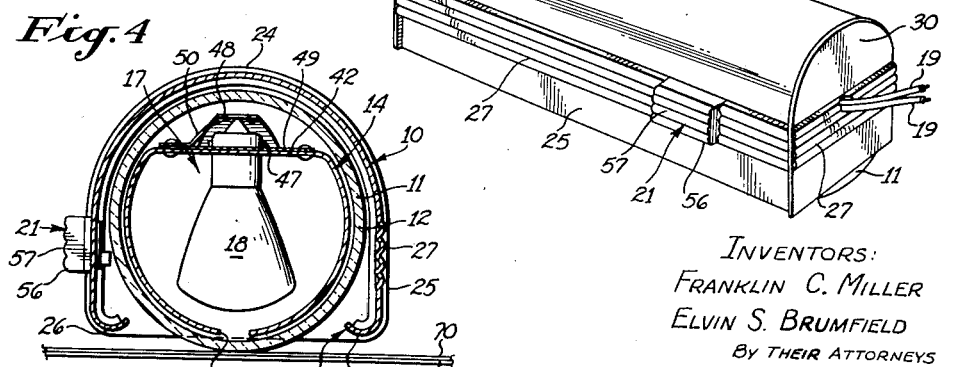
Fig. 4
INVENTORS:
FRANKLIN C. MILLER
ELVIN S. BRUMFIELD
BY THEIR ATTORNEYS
HARRIS, KIECH, FOSTER & HARRIS Patented July 11, 1950

2,514,892

UNITED STATES PATENT OFFICE 2,514,892

PHOTOGRAPHIC REPRODUCING DEVICE

Franklin C. Miller, Los Angeles, and Elvin S. Brumfield, South Pasadena, Calif., assignors to Fairchild, Polley & Eliel, Inc., Los Angeles, Calif., a corporation of California Application October 5, 1946, Serial No. 701,444

1 Claim. (Cl. 240—1)

Our invention relates in general to photographic reproducing devices, and a primary object of the invention is to provide a portable device of this general character which need merely be rolled over the surface of an article in order to obtain a photographic reproduction thereof.

Our invention is particularly adapted for use in reproducing excerpts from reference books, newspapers, or the like, and the photographic reproductions obtained may subsequently be incorporated in reports or various other documents either directly or in transcribed form. For example, if a report is being prepared which requires material from a large number of sources, our portable reproducing device may be employed to obtain reproductions or copies of excerpts covering the desired material with no necessity for laborious note taking, or for transcribing the material directly from the source. Thus, after the photographic copies have been developed and, if desired, positive prints obtained therefrom, the prints may be transcribed or otherwise incorporated in the desired document at any convenient time with no necessity for referring back to the sources of the material reproduced. However, our invention may also be employed for other purposes and we do not intend to be limited to the specific applications discussed above.

Our portable reproducing device or printer operates on the reflex printing principle whereby light rays from a suitable source are directed through a light sensitive sheet, such as paper, film, or the like, and onto the page or sheet to be reproduced. In passing through the sensitized sheet, the light rays partially expose the sheet and are then either absorbed by the page being copied or are reflected thereby, depending upon whether the light rays strike a dark or light portion of the page. The darker portions of the page being reproduced absorb a larger portion of the light rays incident thereon than do the lighter portions thereof, thereby reflecting an image of variable intensity onto the sensitized sheet and exposing various portions of the sheet additional amounts in accordance with the relative absorptive and reflective powers of the page being copied to provide the desired reproduction thereof.

We prefer to employ sheets of light sensitive paper or the like which are not appreciably affected by exposure to light of normal intensity when exposed thereto for a reasonable length of time. The light sensitive sheets may thus be laid out flat on the pages or sheets to be copied so that our portable printing device may be rolled along the light sensitive sheets to provide the desired reproductions, which is another object of our invention.

In general, it is an object of our invention to provide a device including an internally illuminated cylinder, the peripheral wall of which is pervious to light so that a sensitized sheet may be exposed merely by rolling the cylinder therealong. The light rays thus pass through the peripheral wall of the cylinder and through the sensitized sheet and are reflected by the page or sheet being reproduced to expose the sensitized sheet in the manner described.

An important object of our invention is to provide a device of the foregoing character wherein the light source is mounted in a reflector which is located within the cylinder and which directs the light rays emanating from the source through a relatively narrow slot in the reflector so as to provide relatively intense illumination of that portion of a page or sheet which is in the process of being copied. The reflector is rigidly connected to a chassis or housing on which the cylinder is rotatably mounted so that the cylinder may rotate relative to the reflector in rolling over the sensitized sheet which is being exposed.

Another object is to provide a reproducing device which includes a housing that substantially completely encloses the cylinder to provide a convenient means for grasping the device when rolling it over the sensitized sheet which is being exposed, and to provide a device having an attractive and pleasing appearance.

Still another object of our invention is to provide a reproducing device wherein the light source includes one or more electric lamps or bulbs which are connected to a suitable source of electricity through a depressible switch, the switch being mounted on the housing in a location such that it may be closed readily by pressure applied thereto by the hand of an operator grasping the device.

Additional objects of our invention include the provision of a portable reproducing device which is of simple but sturdy construction to insure positive and dependable operation thereof, which is relatively light and quite compact so that it may be operated and transported readily, and which is designed to fit the operator's hand so that it may be carried and operated with a minimum of effort.

The foregoing objects of our invention and the advantages suggested thereby, together with various other objects and advantages thereof which will be apparent hereinafter, may be realized by means of the exemplary embodiment which is described in detail hereinafter and is illustrated in the accompanying drawing. Referring to the drawing:

Fig. 1 is a perspective view of a portable photographic reproducing device or printer which embodies the fundamental principles of our invention;

Fig. 2 is an enlarged plan view thereof with portions of the device broken away to reveal the internal structure thereof;

Fig. 3 is a longitudinal sectional view which is taken along the broken line 3—3 of Fig. 2; and Fig. 4 is a transverse sectional view of the device which is taken as indicated by the arrows 4—4 of Fig. 3.

Referring to the drawing, the reproducing device includes a case or housing 10 which serves as a chassis for a hollow roller or cylinder 11 having a peripheral wall 12 which is pervious to light, the cylinder being rotatably mounted within the case and projecting therefrom through a substantially rectangular opening 13 therein as best shown in Fig. 4. A combination lamp housing and reflector 14 is non-rotatably mounted in the cylinder 11, the reflector being rigidly connected to the case 10 and being provided with a relatively narrow slot 15 therein which extends longitudinally of the cylinder and which registers with the opening 13 in the case. A light producing means 17 is mounted within the reflector 14 and may include several electric lamps or bulbs 18 which may be connected to a suitable source of electricity (not shown). The electrical circuit for the lamps 18 includes a pair of conductors 19 which are shown schematically in Fig. 1, and includes a depressible switch or switch assembly 21 for closing the lamp circuit, the switch being mounted on the case 10 so that it may be closed by pressure applied thereto by the fingers of an operator when grasping the case 10.

Considering the construction of the reproducing device in more detail, the case 10 is preferably of such a size and shape that the operator may grasp the device readily in operating or carrying it by placing his thumbs on one side of the case and his fingers on the opposite side thereof with the palms of his hands resting on the upper portion of the case as viewed in Fig. 1. If desired, the device may be carried and/or operated with one hand by grasping the case with one hand in a similar manner.

The construction illustrated in the drawing provides a case 10 which may be grasped readily in the manner described and which also provides an attractive appearance. As best shown in Fig. 1, the case 10 includes a semi-cylindrical upper portion 24 and a lower portion 25 of substantially rectangular plan form, the opening 13 in the case being at the bottom of the lower portion thereon. The edges 26 of the opening 13 are preferably rolled inwardly as best shown in Fig. 4 to provide the case 10 with a smooth exterior adjacent the opening, thus avoiding possible injury to the operator and avoiding possible damage of the sensitized sheet over which the device is being rolled in the event that the device is tipped inadvertently so that the bottom of the case comes in contact with the sensitized sheet. The case 10 is preferably ribbed, as indicated at 27, to provide convenient gripping surfaces for the operator's fingers when the device is being transported or is in operation.

The case 10 is provided with end walls 30 and 31 which may be formed separately from the body of the case and then suitably secured thereto, if desired. The end walls 30 and 31 are provided with central bosses or projections 32 and 33 thereon, respectively, which extend into the interior of the cylinder 11 through end walls 34 and 35 thereof, respectively, and which lie on the axis A—A of the cylinder. The bosses 32 and 33 are encircled by collars 36 and 37, respectively, which are disposed in openings in the end walls 34 and 35 of the cylinder 11, and which serve as bearings to permit rotation of the cylinder relative to the case 10.

The location of the axis of rotation A—A of the cylinder 11 is such that the cylinder projects through the opening 13 in the case 10, as best shown in Fig. 4, so that the cylinder may be rolled along a surface by an operator in the manner described. The peripheral wall 12 of the cylinder 11 may be formed of any suitable material which is pervious to light, although a transparent material is preferable to avoid excessive diffusion of the light emanating from the lamps 18. The end walls 34 and 35 of the cylinder 11 are preferably, although not necessarily, formed of an opaque material.

As best shown in Fig. 3, the reflector 14 is provided with a pair of end walls 40 and 41 which are rigidly secured to the bosses 32 and 33, respectively, on the end walls 30 and 31 of the case 10 so that the reflector remains stationary relative to the case during rotation of the cylinder 11.

As best shown in Fig. 4, the reflector 14 is of a generally cylindrical shape conforming to that of the roller 11 and is provided with a flat upper portion 42 on which the lamps 18 are mounted. The interior of the reflector 14 is provided with a suitable reflective coating as is well known in the art so that the light rays emanating from the lamps 18 will be directed through the slot 15 and through that portion of the peripheral wall 12 of the cylinder 11 which is opposite the slot.

The slot 15 is preferably relatively narrow so that the intensity of the light directed therethrough is sufficient to expose adequately a sensitized sheet over which the device is being rolled even if the device is rolled over the sensitized sheet at a fairly high speed. Locating the reflector 14 within the cylinder 11 reduces the loss of light which would result from exposing the entire peripheral wall 12 of the cylinder 11 to the light from the lamps 18, and also permits the use of a narrower slot 15 to provide more intense illumination than would otherwise be possible, which is an important feature of our invention.

As best shown in Fig. 3, the lamps 18 are of conventional construction and the bases thereof extend through openings 45 in the flat portion 42 of the reflector 14, the lamps being supported by projecting pins 46 thereon which may be inserted through suitable notches 47 in the edges of the openings 45. The lamps 18 are connected in series by conductors 48 each of which leads from the negative terminal of one of the lamps to the positive terminal of the lamp thereadjacent as best shown in Figs. 2 and 3, the conductors 48 being suitably secured to the flat portion 42 of the reflector 14 and being insulated therefrom as indicated at 49. The conductors 19 are connected to the positive and negative terminals of the lamps 18 at opposite ends of the series, respectively, by conductors 50 as best shown in Figs. 2, the conductors 50 being suitably secured to the reflector 14 and being insulated therefrom as indicated at 51.

As indicated semi-diagrammatically in Fig. 2, the conductors 19 are brought into the case 10 and cylinder 11 through an opening 55 which extends through the end wall 30 of the case 10 and the boss 32 thereon, and which is best shown in Fig. 2. The conductors 19 may be connected to any suitable source of electricity, such as a conventional wall socket (not shown).

The switch 21 is connected in series with the lamps 18 as shown schematically in Fig. 2, and, as best shown in Fig. 1, is so located that it may be actuated by either the operator's fingertips or thumb as he grasps the case 10. The switch 21 includes an actuating bar 56 which is preferably ribbed as indicated at 57 to provide a convenient gripping surface and to harmonize with the ribbed portion 27 of the case 10.

Considering the construction of the switch 21 in more detail, the actuating bar 56 is movable transversely of the case 10 in an opening 58 therein, as best shown in Fig. 2, and is mounted on a resilient contact element 59 having a tab 60 thereon to which a portion 61 of one of the conductors 19 is connected. The contact element 59 is normally separated from another contact element 65, and is adapted to engage the element 65 when the actuating bar 56 is depresed in order to close the lamp circuit, the contact element 65 being provided with a tab 66 thereon to which another portion 67 of the aforesaid conductor 19 is connected. The contact elements 59 and 65 are clamped between insulating members 68 which are suitably secured to the case 10.

When the reproducing device is to be used to copy a page from a book, for example, a sensitized sheet 70 is laid out flat over the page 71 to be copied as shown in Fig. 4. The operator then places the reproducing device on the sensitized sheet 70, grasps the device in the manner described previously, depresses the switch actuating bar 56 with his thumb or fingertips to energize the lamps 18, and then rolls the device along the sensitized sheet to expose the sheet as hereinbefore discussed. The sensitized sheet 70 is then developed and a positive print thereof may be obtained, if desired.

Our invention thus provides an extremely rapid means for obtaining copies or reproductions of material from various sources whenever copies of such material are desired. The copies may, for example, be incorporated in a report or other document either directly or in transcribed form. It will be apparent that if excerpts from various sources are reproduced in this manner, the copies may then be transcribed by a stenographer whenever convenient and with no necessity for referring back to the original sources, which may result in a considerable saving of time particularly if the excerpts are taken from a large number of voluminous sources.

Although we have disclosed a specific embodiment of our invention, we do not intend to be limited to the specific disclosure contained herein since various changes, modifications and substitutions may be incorporated in the embodiment disclosed without departing from the spirit of the invention. We hereby reserve the right, therefore, to all such changes, modifications and substitutions as properly come within the scope of our appended claim.

We claim as our invention:

In a device of the character described, the combination of: a housing having a substantially rectangular opening therein; a cylinder rotatably mounted in said housing and projecting through said opening therein, the peripheral wall of said cylinder being pervious to light; a reflector disposed in said cylinder and rigidly connected to said housing, said reflector having a slot therein which extends longitudinally of said cylinder and which registers with said opening in said housing; electrical light producing means in said reflector; electrical circuit means adapted to connect said light producing means to a source of electricity; and a depressible switch in said circuit means, said switch being mounted on one wall of said housing and being depressible by the hand of an operator grasping said housing.

FRANKLIN C. MILLER.
ELVIN S. BRUMFIELD.

REFERENCES CITED

The following references are of record in the file of this patent:

UNITED STATES PATENTS

| Number | Name | Date |
| --- | --- | --- |
| 2,201,093 | Illo | May 14, 1940 |
| 2,292,668 | Sheridan | Aug. 11, 1942 |
| 2,427,943 | Cochran | Sept. 16, 1947 |

FOREIGN PATENTS

| Number | Country | Date |
| --- | --- | --- |
| 382,379 | Great Britain | Oct. 27, 1932 |